United States Patent [19]

Erk et al.

[11] 3,818,152

[45] June 18, 1974

[54] DEVICE FOR TRANSMITTING ELECTRICAL ENERGY

[75] Inventors: Adil Erk, Braunschweig; Lutz Bohme, Mascherode, both of Germany

[73] Assignee: Messerschmitt-Bolkow-Blohm Gesellschaft mit beschrankter Haftung, Munchen, Germany

[22] Filed: June 14, 1972

[21] Appl. No.: 262,683

[30] Foreign Application Priority Data
June 18, 1971 Germany............................. 2130199

[52] U.S. Cl..................... 191/45, 219/123, 191/49, 191/50
[51] Int. Cl............................................. B60l 5/00
[58] Field of Search.......... 219/123; 191/45, 49, 50, 191/54, 55, 56, 59, 59.1

[56] References Cited
UNITED STATES PATENTS
2,920,183  1/1960  Greene............................. 219/123
3,514,553  5/1970  Penney................................ 191/56
3,628,948  12/1971  Bruning............................ 219/123

Primary Examiner—Robert G. Sheridan
Assistant Examiner—D. W. Keen
Attorney, Agent, or Firm—Woodhams, Blanchard and Flynn

[57] ABSTRACT

A device for transmitting electrical energy from a stationary conductor to a moving load. The load comprises an electrical circuit which is engageable with the stationary conductor to draw power from the electrical conductor. The electrical circuit comprises a current collector which moves in close proximity to the electrical conductor and an electrical arc is formed between the electrical conductor and the current collector. The electrical arc is moved continuously relative to the moving load and to the stationary conductor by the blow field of an electromagnet.

11 Claims, 12 Drawing Figures

DEVICE FOR TRANSMITTING ELECTRICAL ENERGY

The invention relates to a device for transmitting electrical energy from an elongated stationary conductor to a load which is moved along said conductor wherein the load comprises an electrical path having a speed-depending current collector which is connected as a sliding or rolling contact and partially as an electrical arc electrode with an associated driving mechanism for starting the electrode and driving the electrode along the stationary conductor and a blowing device for the electrical arc.

In the development of the quickly moving loads, special problems exist in connection with the input of the required electrical energy from the stationary circuit to the vehicle or the vehicles which are equipped with driving motors. In the case of a current decrease through mechanical contact between a current collector element and the stationary conductor, considerable difficulties exist with an increasing driving speed of the load. These difficulties consist particularly in that changes in the spacing between the current collector and the conductor cannot be balanced out quickly enough and a separation of the current collector and the resulting fluctuating or rather interrupted energy supply must be accepted.

In order to avoid the above-mentioned disadvantages, it has already been suggested to use a combination of a sliding current collector at slow driving speeds, which combination has been described in the beginning, and an electrical arc current collector with a blowing device for the electrical arc in the case of a high speed load. After the ignition of the electrical arc same is thereby blown by the electrode, which is moved with the load, to a section which resists burn-up and is there held by the blow field with its base. In case of a high energy transfer and a longer driving time, however, difficulties arise with this combination particularly with respect to the removal of heat, and also burn-up, which necessitates a frequent exchange of the mechanism with relatively burn-up resistant material. These disadvantages are also not entirely avoided by a rotating movement of the moved electrical arc electrode about an axis traverse to the direction of travel.

The purpose of the present invention is to construct a device of the type described in the beginning in such a manner that a burn-up of the electrode which is moved with the load is extensively avoided or at least distributed evenly over the entire electrode surface and the difficulties of cooling are overcome.

To attain the above purpose, the device, which has been mentioned in the beginning, is characterized according to the invention in such a manner that the part of the current collector which operates as an electrical arc electrode forms a guide rail for the electrical arc base, which guide rail is arranged in the gap zone of a controllable, magnetic blowing device, which is at least effective on the base section and is constructed so that the electrical arc is stabilized and is moved constantly with its base on the electrode and is moved through a back and forth movement in a longitudinal direction of the stationary conductor at the same average speed as the electrical arc electrode in relation to the stationary conductor.

By arranging the electrode, which is provided as a guide rail for the electrical arc base, in the gap zone of the magnetic blowing device, a stabilization of the electrical arc takes place under a simultaneous control of a magnetic blow field which drives the electrical arc.

During the movement of the electrical arc in the longitudinal direction of a guide rail which extends parallel to the stationary conductor, the back and forth movement of the electrical arc base on the guide rail must be adjusted in such a manner that the average speed of the electrical arc corresponds to the speed at which the electrode is moved in relation to the stationary conductor, otherwise the electrical arc would be lengthened, which lengthening would cause many disadvantages, for example: great output loss, reignition through a short circuit and the like.

The electrical arc electrode is advantageously at least partly constructed as a simple longitudinally extending rail and, as above mentioned, is arranged parallel to the stationary conductor in the blow field of an electromagnet having an air gap which extends along the rail, the excitation coil of which electromagnet is divided and is equipped with control mechanisms for selectively accelerating or delaying the electrical arc base for changing the excitation.

To change the effect of the blowing magnet and with it the effect on the electrical arc, a further development of the invention provides that the excitation coil of the blow magnet is connected at least partly, if necessary, through controllable current gates to a current source. The blow magnet is further connected advantageously into the feeder circuit which is energized from the current flow through the electrical arc. The blow magnet is differently excitable in dependency of the current intensity and/or of the local position of the electrical arc, the direction of the feed current or the voltage drop in the electrical arc electrode.

Through the above measures it can be achieved that the electrical arc is deflected in the one direction at a higher speed than the load speed and is slowed in the other direction with respect to the load speed, whereby the difference speed of the electrical arc compared with the load speed with different signs is kept at the average speed of the load.

Another advantageous construction of the new device is achieved according to the invention in such a manner that the electrical arc electrode is constructed as a closed annular rail which is elongated in the longitudinal direction of the stationary conductor and which has a connecting section to a sliding contact. The annular rail is arranged in the blow field of a double magnet having a central leg, which double magnet has on the central leg an excitation coil and on the yoke sections additional coils which reinforce in the zone of one longitudinal section of the annular rail of the blow field of the excitation coil of the central leg and reduces the blow field in the zone of the other rail section.

In this arrangement, the electrical arc is deflected at all times on the one longitudinal section of the ring at a higher speed than the load in driving direction, while it is slowed on the other longitudinal section and is moved continuously along the elongated annular rail. It is thereby advisable to provide the sliding contact for the current drop during low load speeds and to keep the sliding contact movable independent from the annular rail in order to effect a metallic contact and electrical arc ignition, whereby the connecting section of the annular rail is advantageously positioned in the blow field of a further magnet, which during a separation of the sliding contact, blows the electrical arc in direction of the annular rail.

Alternate to the elongated electrical arc guide rail parallel to the stationary conductor, a different construction of the new device is possible, namely the electrical arc electrode can be constructed in a conventional manner as a rotatingly driven electrode. It is thereby advantageous if the electrical arc electrode is constructed as a rotating annular electrode, the section of which, which is provided in the zone of the stationary conductor, is arranged in the field of a blowing magnet.

In order to draw as little heat as possible from the electrical arc in the new device — cooling is, due to the high electrical arc speed, no longer required on the two base electrodes — according to a further development of the invention, the current collector is provided with an air deflector which, in the zone of the blow field, creates an underpressure and, if necessary, deflects the driving wind in such a manner that it enters backwardly into the blow field.

It is also advantageous if the electrical arc current collector can be transferred with its blowing mechanism through a controllable driving mechanism in dependency of the average value of the electrical arc voltage in consideration of the arc current which influences the arc voltage at a predetermined, preferably constant distance to the stationary conductor.

The invention will be discussed hereinafter in connection with several exemplary embodiments illustrated in the enclosed drawings, in which:

FIG. 5b illustrates the arc electrode for the blowing magnet according to FIG. 5a.

The elongated stationary conductor 1 can, as can be seen from each one of the figures, have different cross-sectional shapes which are shaped in dependency of the respective blowing magnet or, on the other hand, the arc electrode.

In the exemplary embodiments of FIGS. 1 to 4, the stationary elongated conductor 1 is a continuous elongated rail having a rectangularly shaped profile. However, this shape is not absolutely necessary; because the conductor 1 could easily have also a different cross-sectional shape such as a round or T-shaped cross-section.

The conductor 1 is connected to schematically illustrated current input terminal 2 which is advantageously arranged along the length of the elongated conductor and positioned in such a manner that the current flows in direction of the arrows 3 and 4 (FIGS. 1 to 3) in driving direction of the electric load or of the moved consumer which must be fed by the arrangement. This direction of current flow automatically results in a current loop, which current loop has a favorable effect on the arc movement.

Figure 1:
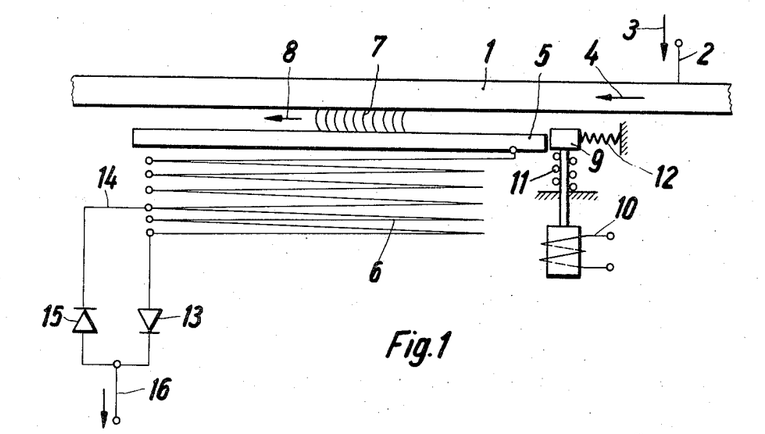
FIG. 1 illustrates schematically one embodiment of the new device, whereby only the circuit of the excitation coil of the blowing magnet is indicated.
Figure 2:
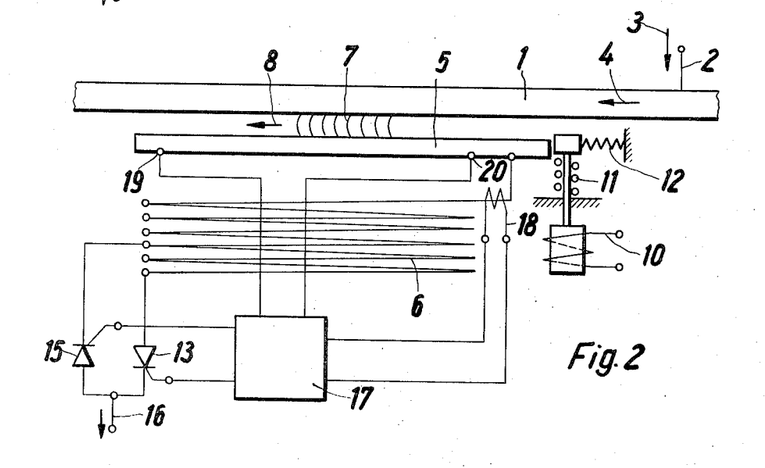
FIG. 2 illustrates an alternate embodiment of the illustration in FIG. 1.

Below the elongated conductor 1 there is provided an electrode 5 which is connected to the load, for example an electric path, and which is arranged in the field of a blowing magnet which is illustrated in FIGS. 1 and 2 only by the coils 6. An electric arc 7 is generated between the electrode 5 and the stationary conductor 1, which electric arc 7 is moved in accordance with the direction of the arrow 8 continuously in the driving direction of the load on the conductor 1, and which in case of a greater current intensity burns in form of a band.

Figures 3, 4:
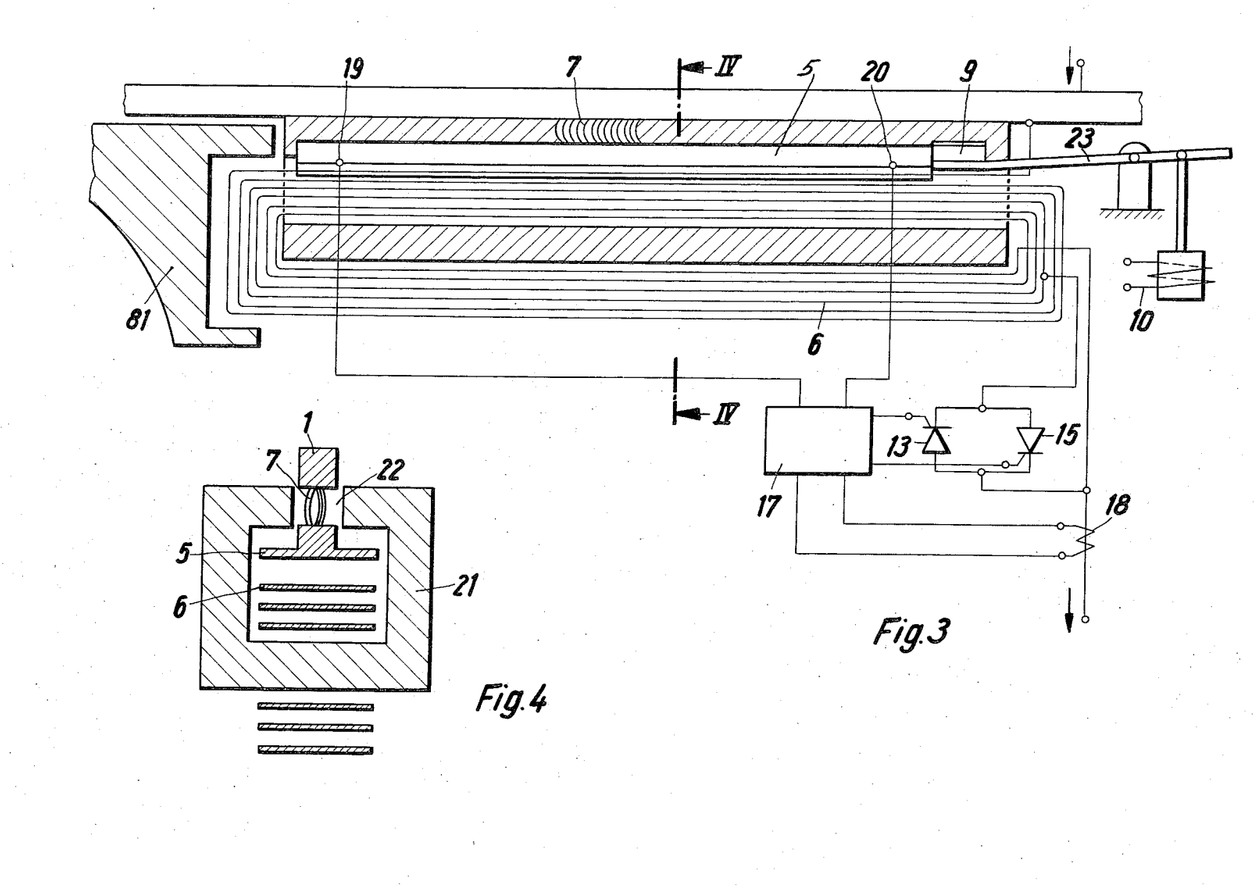
FIG. 3 illustrates the arangement according to FIG. 2, however, including the blowing magnet.
FIG. 4 illustrates a cross-sectional view long the line IV—IV of the arrangement according to FIG. 3.

Aside from the electrode 5, which is identified as an arc electrode, a sliding electrode 9 is provided and which is mechanically urged into contact with the arc electrode 5 by a spring 12 and which can be transferred by means of an electromagnetic operating mechanism 10 against the urging of a spring 11 into the position illustrated in FIGS. 1 to 3. The sliding electrode 9 serves to feed current from the elongated conductor 1 to the load during low driving speeds of the load simultaneously for ignition of the electric arc 7 which through corresponding blow devices is transferred from the sliding electrode to the arc electrode as will be explained in detail below.

In the arrangement according to FIG. 1, the excitation coil 6 of the blowing magnet, which in this figure is not illustrated and in the gap of which the arc electrode 5 is provided, is connected at one end to one side of a current gate 13, while a tap 14 intermediate the ends of the coil 6 is connected to one side of a further current gate 15 oppositely oriented to the current gate 13. The other sides of the gates 13 and 15 are connected to a further conductor 16.

This illustrated arrangement is provided for the alternating current supply of a load, whereby during one half-wave, the entire excitation coil is excited by the inductor current, in the present case by the feed current which flows through the arc 7, while during the other half-wave a reduced excitation of the coil 6 occurs. Due to this alternating excitation of the coil 6, different blow fields are created which per half-wave of the arc current result in a different but strong blow effect and in this manner effect in the one half-wave an acceleration of the electrical arc 7 in the driving direction so that the electrical arc moves faster in the driving direction than the load, while in the other half-wave a slowing of the arc movement occurs and thus the electrical arc travels at a slower speed with reference to the load. Thus, the electrical arc between the stationary conductor 1 and the arc electrode 5 is constantly moved back and forth whereby, however, the electrical arc 7, seen as an average, is moved at the same speed along the stationary conductor 1 as the load in reference to this stationary conductor 1.

In the arrangement according to FIG. 2, the excitation coil 6 is also connected to current gates 13 and 15 which, however, can be controlled and are connected to a suitable control device 17. In the illustration according to FIG. 2, the current gates 13 and 15 are controlled both in dependency of the voltage drop of the arc current in the electrode 5 and also in dependency of the intensity of the arc current, which intensity is measured by a transducer 18 and is fed to the control mechanism 17. The measurement of the voltage drop across the electrode 5 is determined between the measuring points 19 and 20 which are also connected to the control device 17.

The measurement of the voltage drop between the measuring points 19 and 20 represents an analogous actual value acquisition of the location of the electrical arc 7. Alternatively, a digital actual value acquisition is also possible, for example by arranging photocells 18A and 18B (FIG. 10) in the zone of the measuring points 19 and 20 which would be connected to the control device 17 through connecting lines, as illustrated in FIG. 2, to the measuring points 19 and 20. If the electrical arc current leads to a voltage drop which exceeds a predetermined actual value in the electrode 5, a suitable effect of the control device 17 on the current gates 13 or 15 takes place in order to connect the excitation coil completely or only partly into the arc current path. A similar switching or rather partial or full connection of the excitation coil 6 is accomplished through the control device 17 in dependency of the arc intensity so that in case of a low current intensity, the entire blow field or only a portion of this blow field of the magnet, which is excited through the coil 6, becomes effective.

As an example for controlling the magnetic field which drives the electrical arc in dependency of the local position of the arc on the guide rail electrode 1 of the current collector, a principal circuit is described for the case that the field-controlling coil 6 is switched off or switched on as soon as the arc approaches a predetermined required boundary of a local zone on the electrode by a moving away which is too quick or too slow.

Figure 10:
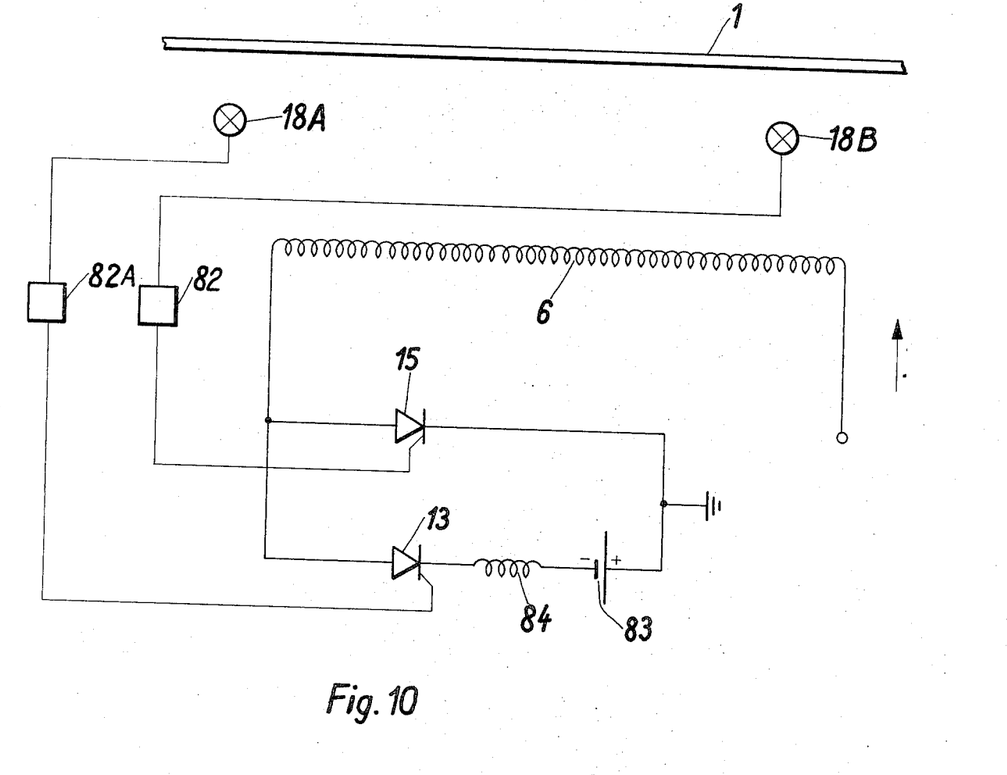
FIG. 10 is an example of an electrical control circuit.

A general electrical schematic as an example of the circuit required for the stabilization of the arc is shown in FIG. 10 and which permits the control of a direct current arc.

The two path transmitters 18A and 18B, for example the photocells, operate as limit value alarms and effect, corresponding to the following circuit, a switching off or on of the field-controlling coil 6. The current flowing through this coil causes as an electrical arc current the self-energized or as any kind of control current the foreign-energized magnetic control field.

If it is assumed that the reaction of the limit value alarm 18B requires a switching on of the control coil 6, then, through an impulse generator 82 of a known type, a signal is fed to the gate of a thyristor 15 which causes same to conduct and makes possible a field-producing current flow through the control coil 6. If the reaction of the limit value alarm 18A requires a turning off of the coil 6, then, through a further impulse generator 82A, the thyristor 13 is caused to conduct. Through this, through a suitably poled energy storage device 83, such as a battery or suitable charged capacitor and the like, a counter current is driven through the thyristor 15, which forces the entire current to zero and thus again blocks the thyristor 15. The inductance 84 prevents in a known manner a too steep increase of the quenching current.

Should in place of the direct current arc an alternating current arc be forced for the back and forth movement by turning on and off of the control coil, then the above-described circuit must be used in duplicate construction, each for the positive and negative current half wave.

Thus it is possible through the desired construction to create a predetermined relative movement of the electrical arc 7 in relation to the electrode 5 as a back and forth movement.

Alternative to the illustrated self-excitation of the coil 6 in the exemplary embodiments of FIGS. 1 and 2, it is also possible to provide an auxiliary source of excitation or, if needed, a partial auxiliary source with a partial reliance on a self-excitation.

FIGS. 3 and 4 illustrate the arrangement of FIG. 2 in a slightly more detailed manner, particularly by illustrating the blowing magnet with the associated excitation coil 6.

The blowing magnet is, according to FIGS. 3 and 4, constructed as an almost closed annular magnet 21 which has a gap 22 in which is located the electrical arc 7. The arc electrode 5 is, according to the illustration of FIG. 4, approximately C-shaped so that the electrical arc 7 is held exclusively in the gap 22 and in this manner is stabilized.

The magnet 21 is a laminated construction and is energized by the coil 6 which consists of flat profiles as shown in FIG. 4.

The sliding contact 9 is connected to the operating mechanism 10 through a rocker arm 23, which operating mechanism 10 is effective in the same manner as the operating mechanism which is described in FIGS. 1 and 2 and also identified with 10.

The circuit arrangement of the current gates 13 and 15 and of the control mechanism 17 and of the current transducers 18 and also of the measuring points 19 and 20 for determining the voltage drop in the electrode 5 corresponds completely to the described arrangement of FIG. 2.

Figure 5A:
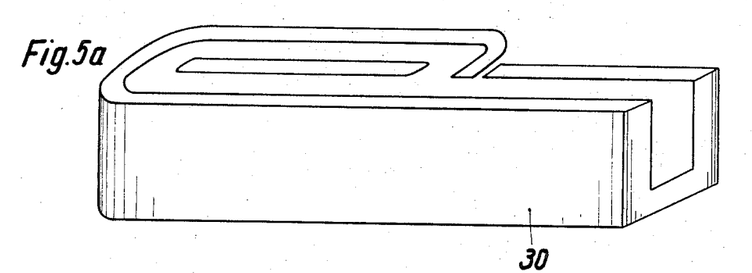
FIG. 5a illustrates schematically one particular construction of a blowing magnet.
Figure 5B:
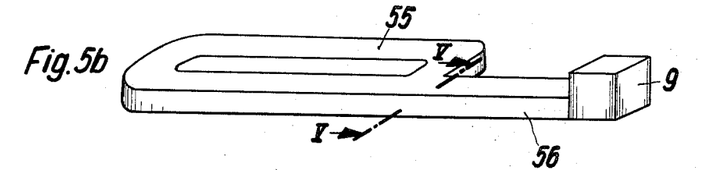

The construction of the electromagnet illustrated in FIG. 5a is used to receive an annular electrode 55 which is illustrated in FIG. 5b and has an electrical conductor connecting section 56 which contacts the sliding contact 9. The sliding contact 9 is thereby arranged in the same manner as was described in connection with FIGS. 1 to 3.

Figures 5C, 6, 7:
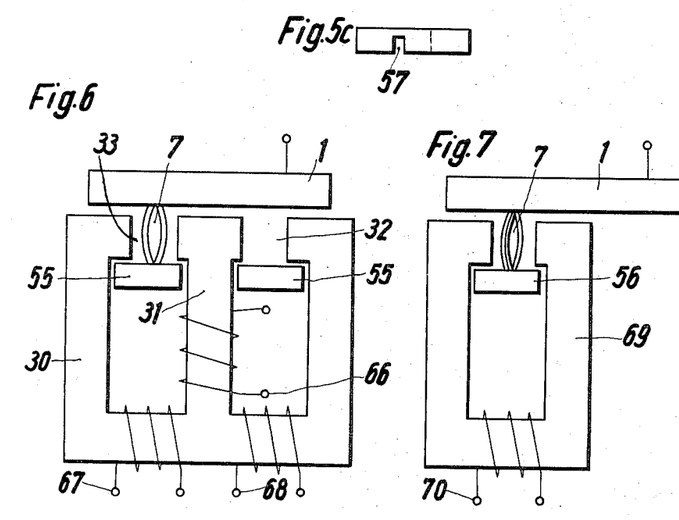
FIG. 5c is a cross-sectional view of the electrode along the line V—V in FIG. 5b.
FIG. 6 is a schematic cross-sectional view of an arrangement which consists of the blowing magnet according to FIG. 5a and the associated electrode according to FIG. 5b.
FIG. 7 is a corresponding cross-sectional view like FIG. 6, however, in the zone outside the annular shape of the rail according to FIG. 5b.

The magnet according to FIG. 5a is, as can be taken particularly from FIG. 6, constructed as a double magnet 30 with a central leg 31 so that two gaps 32, 33 are created in which the electrical arc 7 burns under the stabilizing effect of the gap chambers. The annular rail 55 has in the zone of the transition to the connecting section 56 a cross section according to FIG. 5c, namely it is provided with a notch 57, which notch forms a narrow point for the arc current so that at a corresponding drop of the arc current from the annular rail, the arc is not inclined to shift onto the connecting section 56.

The electrical arc 7 is moved due to the excitation of the magnet 30 in the zone of its construction as a double magnet. In the zone of the annular rail 55, the arc travels continuously along the annular rail 55 and burns thereby at all times in the gaps 32, 33, whereby again it is assured that the electrical arc is moved faster on the one section of the annular rail 55 than the moving load, for example the path, in relation to the stationary conductor 1, while in the other zone of the annular rail a relative slowing of the arc movement occurs so that aside from the movement of the electrical arc along the conductor 1 a constant movement of its base on the annular rail 55 will occur.

To produce these differing movements, the magnet 30, which again consists of laminated iron, is equipped on its central leg with an excitation coil 66 and is furthermore provided with additional coils 67, 68 on the yoke sections. The coils 66, 67 and 68 are thereby excited through suitable circuit arrangements similarly as they have been described in connection with FIGS. 1 to 3, so that one of the additional coils effects in the gap 32 or 33 an increase of the blow field, while the other coil leads to a reduction of the blow field in the other gap. Through this different blow effect in the two gaps 32, 33, which can be controlled in the same manner as the blow effect of the magnet 21 according to FIG. 3, the different speed of movement for the electrical arc 7 in the mentioned gap chambers is accomplished.

The connecting section 56, which is provided between the annular rail 55 and the sliding contact 9, is, according to the illustration of FIG. 7, enclosed by a magnet 69 which carries an excitation coil 70 which assures that after a separation of the sliding contact 9 and ignition of the electrical arc 7 same is moved on the connecting section 56 in direction of the annular rail 55.

Figure 8:
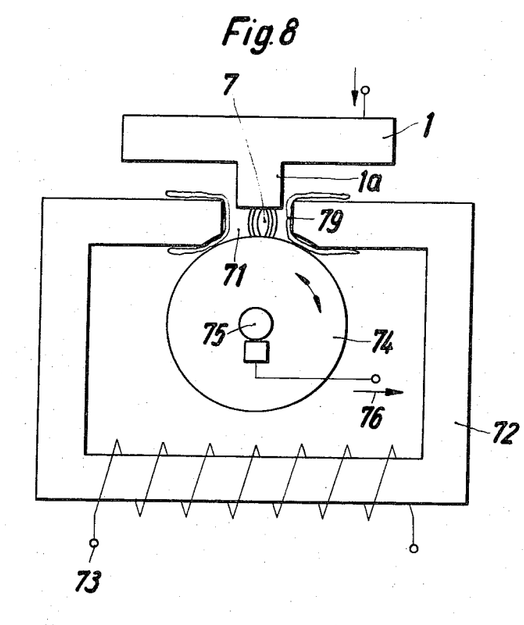
FIG. 8 illustrates a different embodiment of the new device with a rotating electrode.

In the arrangement according to FIG. 8, the elongated conductor 1 has a C-shaped cross section, the tongue 1a of which extends into a gap 71 of a magnet 72, which again is equipped with an excitation coil 73 for either self or auxiliary excitation. The electrical arc electrode is, in the embodiment of FIG. 8, constructed as a rotating electrode 74 from which the current for the load is taken from the rotating shaft 75 in direction of the arrow 76 by means of suitable current collectors for such rotating current conducting parts.

The rotating electrode 74 extends in longitudinal direction of the magnet 72 so that the electrical arc 7 is moved, due to the blow field in the gap 71, in a longitudinal direction of the magnet 72 depending on the direction of the blow field and moves simultaneously on the peripheral surface of the electrode in peripheral direction through the rotational movement of the electrode 74.

The excitation coil 73 can thereby again be excited, corresponding with the illustrations of FIGS. 1 and 2, in order to achieve the desired movements of the electrical arc in a longitudinal direction of the stationary conductor 1.

Figure 9:
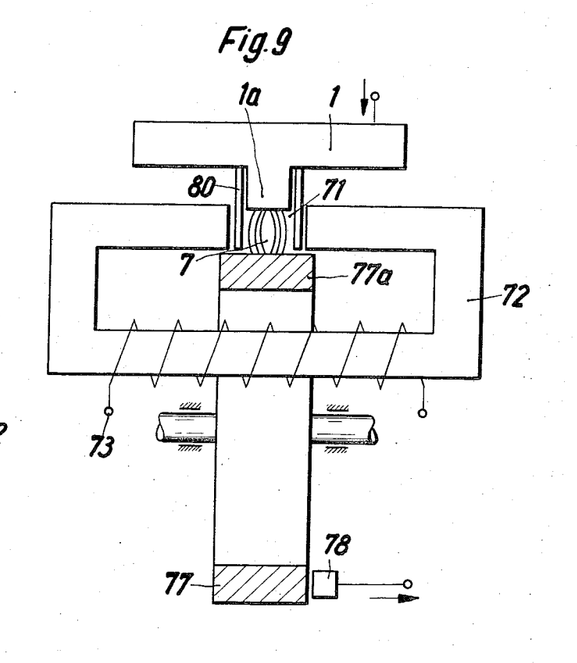
FIG. 9 illustrates also the arrangement with a rotating electrode, however, different from the construction according to FIG. 8.

In the arrangement according to FIG. 9, a rotating electrode 77 is also provided which, however, is constructed as an annular electrode and the section 77a of which, which is provided in the zone of the stationary conductor 1, is positioned in the blow field of the electromagnet 72. The electromagnet 72, like the magnet illustrated in FIG. 8 is equipped with an excitation coil 73 for either an auxiliary or self-excitation or both.

The current is accomplished, in the case of the example in FIG. 9, by a sliding or brush contact 78, as it is known for example from collector rings.

The examples of FIGS. 8 and 9 illustrate that the gap 71 for the electrical arc 7 is defined laterally by insulating walls 79 (FIG. 8) or 80 (FIG. 9). The walls, according to FIG. 8, grip around the pole pieces of the magnet 72. The walls, according to FIG. 9, define side walls of the section 1a of the elongated conductor 1. These insulating walls 79 or 80 consist advantageously of heat-resisting material, however, little cooling material so that only small amounts of heat are taken from the electrical arc 7. A cooling of the electrical arc is not desired in the described arrangements because of the quick movement of the electrical arc since through cooling the electrical arc additional losses and an increased voltage drop occur.

In order to extensively reduce the arc cooling, according to the example of FIG. 3, an air deflector 81 can be provided which creates in the zone of the blow field of the magnet 21, or the alternate embodiments of the magnets illustrated in the other figures, an under-pressure and if necessary deflects the driving air so that it enters backwardly into the gap chamber of the blow field. Through this arrangement, one achieves the desired result that the electrical arc at the high speed of the load need not be moved against the resistance of the driving air but is, instead, supported in its movement in the driving direction.

In the arrangement according to FIG. 9, the rotating annular electrode 77 can be constructed in such a manner that it simultaneously compensates for the mechanical current fall. In this case, the annular electrode with its current collector 78 must be movably arranged through a suitable device against the elongated conductor 1 and must be arranged removably therefrom. These driving mechanisms, which are necessary for the movement of the annular electrode 77 and which can also be used for the remaining electrical arc electrodes, make it possible, in dependency of the medium value of the arc voltage and in consideration of the arc current, to adjust the arc electrodes in such a manner that a constant distance from the stationary conductor 1 is maintained.

In order to assure, in the arrangement of electrical arc electrodes in form of longitudinal rails parallel to the stationary conductor, that the electrical arc does not run beyond the ends of the electrodes, the device can be constructed in such a manner that the blowing magnet, for creating the back and forth movement of the electrical arc, extends over the substantial length of the guide rail, while at the ends of this guide rail each one additional blowing magnet is arranged, similar to the magnet 69 in FIG. 7 which surrounds the connecting section 56. These magnets, which are provided at the ends of the rail, are excited in such a manner that the electrical arc, before it reaches the rail ends, is stopped and is blown in the opposite direction. In this manner, a movement of the electrical arc from the arc electrode or is curved in or against the driving direction is prevented.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for transmitting electrical energy from an elongated stationary electrical conductor to a load moving in a direction generally parallel to said electrical conductor having electrode means mounted on said load for removing electrical energy from said electrical conductor through an electric arc, comprising the improvement wherein said electrode means includes means defining an elongated guide surface spaced from said electrical conductor and extending generally in a parallel direction therewith, said electrical arc being formed between said guide surface means and said electrical conductor, said improvement further comprising means defining an elongated controllable blow magnet adapted to produce a magnetic field in said gap, said blow magnet means being mounted on said load closely adjacent said elongated, electrical conductor, said blow magnet means including means defining a gap in which said guide surface means is located and between which said electric arc passes, said magnetic field generated by said blow magnet means effecting a control of the position of said electric arc along said guide surface means, and control means for controlling said blow magnet to effect a control and stabilization of said magnetic field produced in said gap means to cause a constant movement of said electric arc back and forth along said guide surface means as said load moves in said direction parallel to said electrical conductor and at an average speed equal to the speed of said load.

2. A device according to claim 1, wherein said blow magnet means includes means defining a magnetic field generating coil; and
   wherein said control means includes controllable current gates connected in electrical circuit with said electric arc, said guide surface means and said coil, said gates being controlled in response to the position of said electric arc on said guide surface means.

3. A device according to claim 1, wherein said blow magnet means includes means defining a magnetic field generating coil; and
   wherein said control means includes controllable current gates connected in electrical circuit with said electric arc, said guide surface means and said coil, said gates being controlled in response to the polarity of the potential drop across said electric arc.

4. A device according to claim 1, wherein said blow magnet means includes means defining a magnetic field generating coil; and
   wherein said control means includes controllable current gates connected in electrical circuit with said electric arc, said guide surface means and said coil, said gates being controlled in response to the current intensity in said electric arc.

5. A device according to claim 1, wherein said elongated blow magnet means comprises an annular core having a central leg and an annular outer leg encircling said central leg and defining a double blow magnet having a pair of longitudinally extending gaps parallel to said electrical conductor, said central leg having first field coil means wound thereon and said annular outer wall having second and third field coil means wound thereon, said second field coil means being wound on one longitudinally extending side and said third field coil means being wound on the other longitudinally extending side, said second field coil means on said one longitudinally extending side reinforcing the magnetic field generated by said first field coil means in one of said longitudinally extending gaps, said third field coil means on said other longitudinal extending side reducing the magnetic field generated by said first field coil means in the other of said longitudinally extending gaps.

6. A device according to claim 1, wherein said guide surface means is an elongated annular ring having first and second sections and means defining a sliding contact connected to said annular ring through a connecting section, said elongated annular ring being mounted so that each of said first and second sections is positioned in separate ones of said longitudinally extending gaps.

7. A device according to claim 1, wherein said elongated blow magnet means further includes a further core section defining an additional gap and means for generating a magnetic field in said additional gap; and wherein said connecting section is received in said additional gap whereby when said sliding connection between said electrical conductor and said sliding contact is terminated and an electric arc is formed between said electrical conductor and said connecting section, said further core section and magnetic field generating means will effect a movement of said electric arc to said annular ring.

8. A device according to claim 1, wherein said guide surface means is a surface of rotation, the axis of which is parallel to said electrical conductor, a portion of said surface of said surface of rotation being positioned in said gap.

9. A device according to claim 8, including air deflector means for producing an air underpressure in said gap.

10. A device according to claim 9, wherein said air deflector means includes means for diverting the wind as said load is moved into the trailing end of said gap so that the movement of said electric arc is supported by an air movement.

11. A device according to claim 8, including means for maintaining a predetermined spacing between said electrical conductor and said guide surface means in response to a medium value of the potential drop in said electrical arc.

* * * * *

UNITED STATES PATENT OFFICE
CERTIFICATE OF CORRECTION

Patent No. 3,818,152            Dated June 18, 1974

Inventor(s)  Adil Erk & Lutz Bohme

It is certified that error appears in the above-identified patent and that said Letters Patent are hereby corrected as shown below:

Column 10, line 18; change "1" to --5--.

Column 10, line 26; change "1" to --6--.

Signed and sealed this 29th day of October 1974.

(SEAL)
Attest:

McCOY M. GIBSON JR.
Attesting Officer

C. MARSHALL DANN
Commissioner of Patents